(12) United States Patent
Lakkis

(10) Patent No.: US 8,831,063 B2
(45) Date of Patent: Sep. 9, 2014

(54) SINGLE CARRIER BURST STRUCTURE FOR DECISION FEEDBACK EQUALIZATION AND TRACKING

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 777 days.

(21) Appl. No.: 12/404,903

(22) Filed: Mar. 16, 2009

(65) Prior Publication Data

US 2009/0238240 A1 Sep. 24, 2009

Related U.S. Application Data

(60) Provisional application No. 61/037,652, filed on Mar. 18, 2008.

(51) Int. Cl.
*H04B 1/00* (2006.01)
*H04L 25/03* (2006.01)

(52) U.S. Cl.
CPC . *H04L 25/03057* (2013.01); *H04L 2025/03414* (2013.01); *H04L 2025/0349* (2013.01)
USPC .......................................... 375/130; 375/295

(58) Field of Classification Search
USPC ........................................................ 375/130
See application file for complete search history.

(56) References Cited

U.S. PATENT DOCUMENTS

| | | | | |
|---|---|---|---|---|
| 3,935,572 A | * | 1/1976 | Broniwitz et al. | 342/80 |
| 5,748,686 A | * | 5/1998 | Langberg et al. | 375/367 |
| 5,943,361 A | * | 8/1999 | Gilhousen et al. | 375/142 |
| 6,473,506 B1 | * | 10/2002 | Hook et al. | 379/279 |
| 6,674,822 B1 | * | 1/2004 | Legrand et al. | 375/355 |
| 7,292,641 B2 | * | 11/2007 | Suh et al. | 375/260 |
| 7,319,690 B2 | * | 1/2008 | Wu et al. | 370/342 |
| 7,412,005 B2 | * | 8/2008 | Wang et al. | 375/260 |
| 7,418,043 B2 | * | 8/2008 | Shattil | 375/260 |
| 7,529,310 B2 | * | 5/2009 | Auer | 375/267 |
| 7,702,991 B2 | * | 4/2010 | Haratsch | 714/796 |
| 7,778,151 B2 | * | 8/2010 | Bertrand et al. | 370/208 |
| 7,970,083 B2 | * | 6/2011 | Liu et al. | 375/340 |
| 8,005,171 B2 | * | 8/2011 | Lakkis | 375/343 |
| 8,009,755 B2 | * | 8/2011 | Halfmann et al. | 375/267 |

(Continued)

FOREIGN PATENT DOCUMENTS

| | | |
|---|---|---|
| CN | 1617534 A | 5/2005 |
| EP | 1744513 A2 | 1/2007 |

(Continued)

OTHER PUBLICATIONS

International Search Report—PCT/US2009/037431—International Search Authority, European Patent Office,Mar. 5, 2010.

(Continued)

*Primary Examiner* — Chieh Fan
*Assistant Examiner* — Santiago Garcia
(74) *Attorney, Agent, or Firm* — Dang M. Vo (57) ABSTRACT

Certain aspects of the present disclosure relate to a method for employing a special format for transmitting data blocks which allows parallel equalizations at a receiver. By applying parallel equalization operations, a clock at the receiver can operate at a fraction of the input signal's data rate, which is more practical in the case of very high data rates while power dissipation is also reduced.

44 Claims, 10 Drawing Sheets

(56) References Cited

U.S. PATENT DOCUMENTS

| | | | |
|---|---|---|---|
| 8,418,040 B2 | 4/2013 | Lakkis | |
| 2001/0033614 A1 | 10/2001 | Hudson | |
| 2003/0007554 A1 | 1/2003 | Birru | |
| 2004/0184550 A1 | 9/2004 | Yoshida et al. | |
| 2005/0013381 A1* | 1/2005 | Suh et al. | 375/260 |
| 2005/0249319 A1* | 11/2005 | Suh et al. | 375/347 |
| 2006/0039492 A1* | 2/2006 | Azadet et al. | 375/262 |
| 2007/0047433 A1* | 3/2007 | Kao | 370/208 |
| 2007/0058734 A1* | 3/2007 | Kao et al. | 375/260 |
| 2007/0086328 A1* | 4/2007 | Kao et al. | 370/208 |
| 2007/0104284 A1* | 5/2007 | Kim et al. | 375/265 |
| 2007/0168841 A1* | 7/2007 | Lakkis | 714/781 |
| 2007/0189237 A1* | 8/2007 | Jaatinen et al. | 370/335 |
| 2007/0189424 A1* | 8/2007 | Haratsch | 375/340 |
| 2007/0208794 A1* | 9/2007 | Jain | 708/403 |
| 2008/0170545 A1* | 7/2008 | Kim et al. | 370/329 |
| 2008/0298435 A1* | 12/2008 | Lakkis | 375/140 |
| 2009/0016464 A1* | 1/2009 | Zheng et al. | 375/295 |
| 2009/0168641 A1* | 7/2009 | Kao et al. | 370/208 |
| 2009/0316808 A1* | 12/2009 | Tanaka | 375/260 |
| 2011/0151870 A1* | 6/2011 | Choi et al. | 455/435.1 |

FOREIGN PATENT DOCUMENTS

| | | |
|---|---|---|
| JP | 2006094215 A | 4/2006 |
| JP | 2006238355 A | 9/2006 |
| TW | I262731 | 9/2006 |
| WO | WO2006052463 | 5/2006 |
| WO | WO-2009049241 | 4/2009 |

OTHER PUBLICATIONS

Ryuhei Funada et al: A design of single carrier based PHY for IEEE 802.15.3c standard The 18th Annual IEEE International Symposium on Personal, Indoor and Mobile Radio Communications (PIMRCI07), Sep. 1, 2007, pp. 1-5, XP031168950ISBN.

Written Opinion—PCT/US2009/037431, International Search Authority, European Patent Office, Mar. 5, 2010.

Alan Gatherer, et al.,"High sampling rate adaptive decision feedback equalizers", 1990 International Conference on Acoustics, Speech, and Signal Processing, 1990. ICASSP-90., United States, IEEE, Apr. 3, 1990, vol. 2, pp. 909-912.

Lin C.S., et al.,"Concurrent Digital Adaptive Decision Feedback Equalizer for 10GBase-LX4 Ethernet System", IEEE Custom Integrated Circuits Conference, 2007.CICC '07., United States, IEEE, Sep. 16, 2007, pp. 289-292.

Raghunath K.J., et al.,"Parallel adaptive decision feed back equalizers", IEEE International Conference on Acoustics, Speech, and Signal Processing, ICASSP-92.,United States, IEEE, Mar. 23, 1992, vol. 4, pp. 353-356.

Yongru G.U., et al.,"High-Speed Architecture Design of Tomlinson-Harashima Precoders", IEEE Transactions on Circuits and Systems I: Regular Papers, United States, IEEE, Sep. 2007,vol. 54, Issue.9, pp. 1929-1937.

Taiwan Search Report—TW098108791—TIPO—Jul. 23, 2012.

Yoshikawa H, FFT (Fast Fourier Transform), Japan, Hiroshi Yoshikawa, Dec. 7, 2005, No. 1-16 page, [online], [search date Mar. 25, 2015], Internet <http://chaosweb.complex.eng.hokudai.ac.jp/~josch/workshop/math/fft/FFT_text.pdf>.

* cited by examiner

SINGLE CARRIER BURST STRUCTURE FOR DECISION FEEDBACK EQUALIZATION AND TRACKING

CLAIM OF PRIORITY UNDER 35 U.S.C. §119

The present Application for Patent claims priority to Provisional Application No. 61/037,652, filed Mar. 18, 2008, and assigned to the assignee hereof and hereby expressly incorporated by reference herein.

BACKGROUND

1. Field

Certain aspects of the present disclosure generally relate to a wireless communication and, more particularly, to physical-layer signal processing in a wireless communication system.

2. Background

An ultra-wideband (UWB) Physical Layer (PHY) can be used for millimeter wave communications (e.g., communications with carrier frequency of approximately 60 GHz). A dual-mode UWB PHY supporting single carrier and Orthogonal Frequency Division Multiplexing (OFDM) modulation can employ a common mode. The common mode is a single-carrier mode used by both single-carrier and OFDM devices for beaconing, network-control signaling, and base-rate data communications. The common mode is typically required for interoperability between different devices and different networks.

The Institute of Electrical and Electronics Engineers (IEEE) 802.15.3c standard is intended to support a millimeter-wave-based PHY as an alternative for the existing 802.15.3 Wireless Personal Area Network (WPAN) standard 802.15.3-2003. This particular millimeter-wave WPAN should operate in a new and clear band including 57-64 GHz unlicensed band specified by the Federal Communications Commission (FCC). The millimeter-wave WPAN should allow high coexistence (i.e., close physical spacing) with all other microwave systems in the 802.15 family of WPANs. In addition, the millimeter-wave WPAN should support high data rate applications (i.e., at least 1 Gbps data rates), such as high speed internet access, streaming video, etc. Very high data rates in excess of 2 Gbps may be provided for simultaneous time dependent applications such as real time multiple High Definition Television (HDTV) video streams.

A frame format for UWB single-carrier data communications typically comprises a known sequence followed by a data portion. The known sequence may be a Golay code, which can be used by a receiver for tracking, channel estimation, detection, and channel decoding. Signal detection at the receiver can be based on decision feedback equalization (DFE) or some other equalization technique. A clock frequency employed by a part of receiver dedicated for equalization typically operates at an integer-multiple of an input signal's data rate. For very high data rates (e.g., 1728 MHz, which has been adopted in the IEEE 802.15.3c standard) it is impractical to operate such high clock frequencies. In addition, power dissipation can be prohibitively high in this case.

SUMMARY

Certain aspects of the present disclosure provide a method for wireless communications. The method generally includes generating a data stream comprising at least one data block, wherein a length M of the data block is determined by an equation $M=2^m$ samples, where m is a positive integer, inserting, between sub-blocks of the at least one data block, sequences of known data, and transmitting on a wireless channel the data stream composed of the sub-blocks and the inserted sequences of known data.

Certain aspects of the present disclosure provide a method for wireless communications. The method generally includes receiving at least one data block of a data stream on a channel with one or more paths, each of the at least one data block having known sequences of data between sub-blocks of the data block, obtaining a channel estimate for at least one path of the channel, and performing multiple equalizations in parallel, each equalization utilizing the channel estimate, at least one of the known sequences, and at least one of the sub-blocks.

Certain aspects of the present disclosure provide an apparatus for wireless communications. The apparatus generally includes a generator for generating a data stream comprising at least one data block, wherein a length M of the data block is determined by an equation $M=2^m$ samples, where m is a positive integer, a device for inserting, between sub-blocks of the at least one data block, sequences of known data, and a transmitter for transmitting on a wireless channel the data stream composed of the sub-blocks and the inserted sequences of known data.

Certain aspects of the present disclosure provide an apparatus for wireless communications. The apparatus generally includes a receiver for receiving at least one data block of a data stream on a channel with one or more paths, each of the at least one data block having known sequences of data between sub-blocks of the data block, an estimator for obtaining a channel estimate for at least one path of the channel, and an equalizer for performing multiple equalizations in parallel, each equalization utilizing the channel estimate, at least one of the known sequences, and at least one of the sub-blocks.

Certain aspects of the present disclosure provide an apparatus for wireless communications. The apparatus generally includes means for generating a data stream comprising at least one data block, wherein a length M of the data block is determined by an equation $M=2^m$ samples, where m is a positive integer, means for inserting, between sub-blocks of the at least one data block, sequences of known data, and means for transmitting on a wireless channel the data stream composed of the sub-blocks and the inserted sequences of known data.

Certain aspects of the present disclosure provide an apparatus for wireless communications. The apparatus generally includes means for receiving at least one data block of a data stream on a channel with one or more paths, each of the at least one data block having known sequences of data between sub-blocks of the data block, means for obtaining a channel estimate for at least one path of the channel, and means for performing multiple equalizations in parallel, each equalization utilizing the channel estimate, at least one of the known sequences, and at least one of the sub-blocks.

Certain aspects provide a computer-program product for wireless communications. The computer-program product includes a computer readable medium encoded with instructions executable to generate a data stream comprising at least one data block, wherein a length M of the data block is determined by an equation $M=2^m$ samples, where m is a positive integer, insert, between sub-blocks of the at least one data block, sequences of known data, and transmit on a wireless channel the data stream composed of the sub-blocks and the inserted sequences of known data.

Certain aspects provide a computer-program product for wireless communications. The computer-program product includes a computer readable medium encoded with instructions executable to receive at least one data block of a data stream on a channel with one or more paths, each of the at least one data block having known sequences of data between sub-blocks of the data block, obtain a channel estimate for at least one path of the channel, and perform multiple equalizations in parallel, each equalization utilizing the channel estimate, at least one of the known sequences, and at least one of the sub-blocks.

Certain aspects provide an access point. The access point generally includes at least one antenna a generator for generating a data stream comprising at least one data block, wherein a length M of the data block is determined by an equation $M=2^m$ samples, where m is a positive integer, a device for inserting, between sub-blocks of the at least one data block, sequences of known data, and a transmitter for transmitting via the at least one antenna on a wireless channel the data stream composed of the sub-blocks and the inserted sequences of known data.

Certain aspects provide a mobile handset. The mobile handset generally includes at least one antenna, a receiver for receiving via the at least one antenna at least one data block of a data stream on a channel with one or more paths, each of the at least one data block having known sequences of data between sub-blocks of the data block, an estimator for obtaining a channel estimate for at least one path of the channel, and an equalizer for performing multiple equalizations in parallel, each equalization utilizing the channel estimate, at least one of the known sequences, and at least one of the sub-blocks.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be advantageous to systems employing Ultra Wide Band (UWB) signals including millimeter-wave signals. However, the present disclosure is not intended to be limited to such systems, as other coded signals may benefit from similar advantages.

Figure 1:
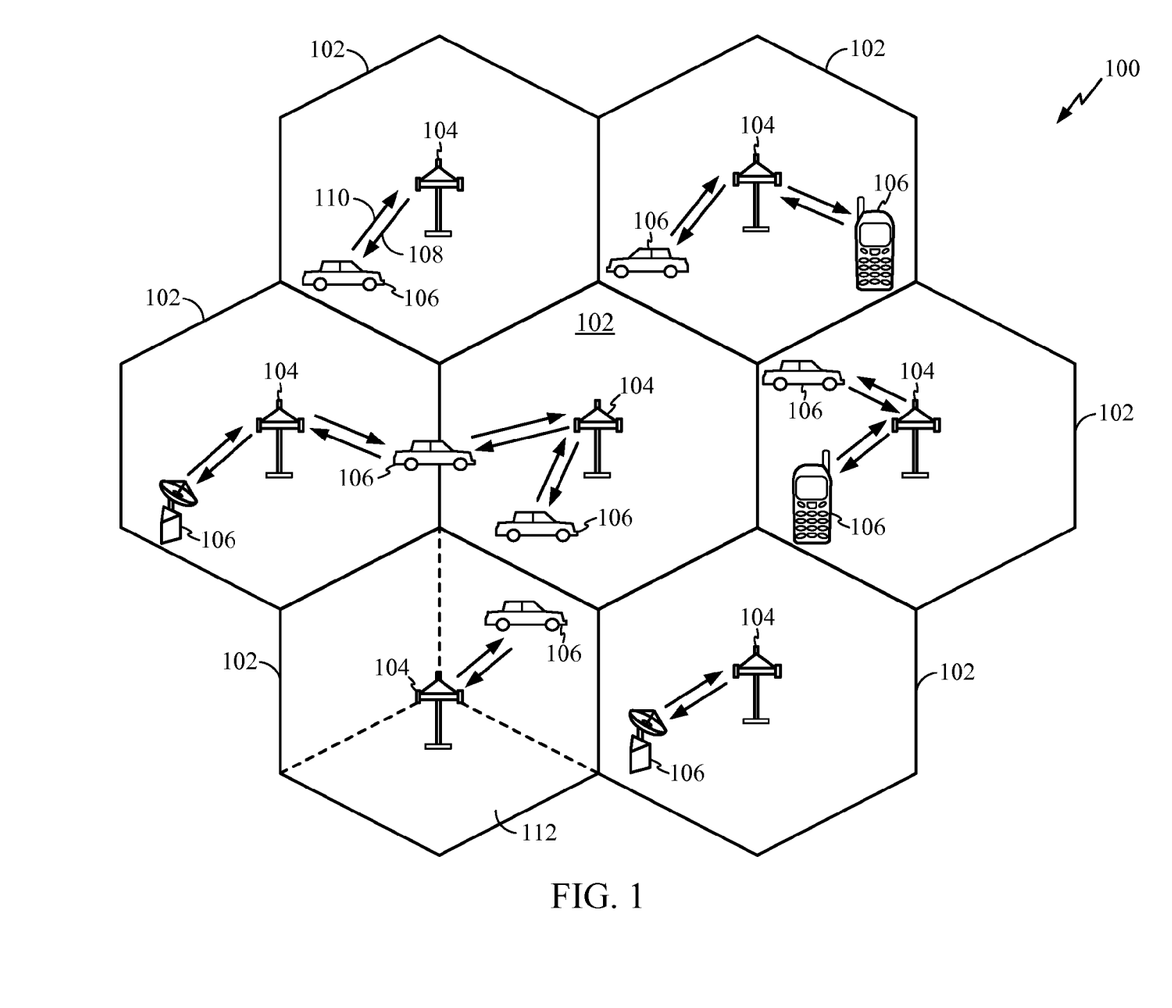
FIG. 1 illustrates an example wireless communication system, in accordance with certain aspects of the present disclosure.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with UWB techniques. If this is the case, the wireless communication system 100 may be referred to as an UWB system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
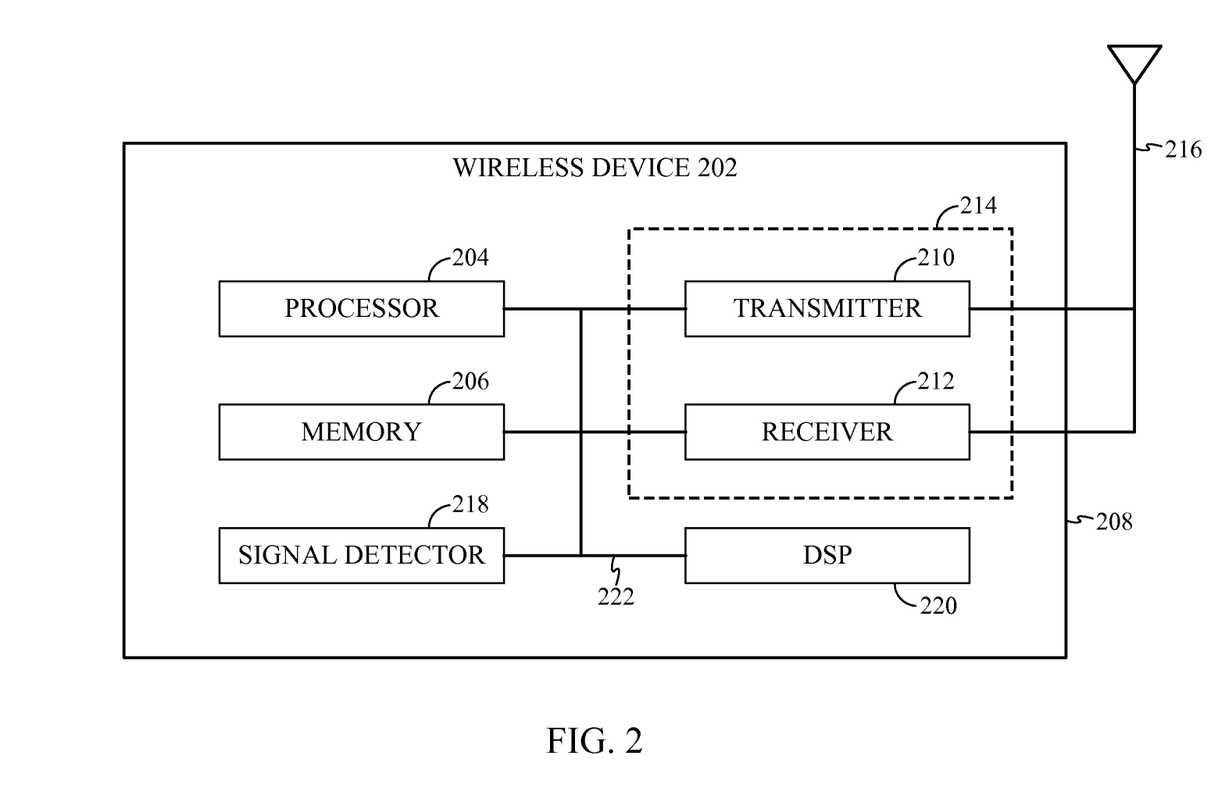
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Sequential Equalization

Figure 3:
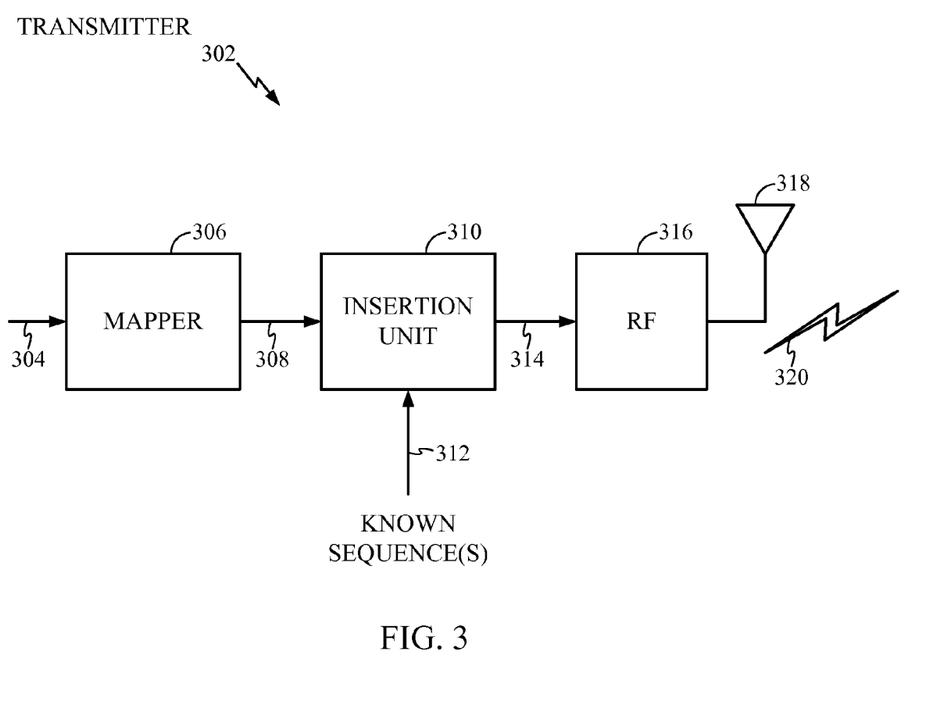
FIG. 3 illustrates an example transmitter that may be used within a wireless communication system in accordance with certain aspects of the present disclosure.

FIG. 3 illustrates an example of a transmitter 302 that may be used within a wireless communication system 100 that utilizes single-carrier or some other transmission technique. Portions of the transmitter 302 may be implemented in the transmitter 210 of a wireless device 202. The transmitter 302 may be implemented in a base station 104 for transmitting data 304 to a user terminal 106 on a downlink 108. The transmitter 302 may also be implemented in a user terminal 106 for transmitting data 304 to a base station 104 on an uplink 110.

Data 304 to be transmitted are shown being provided as input to a mapper 306. The mapper 306 may map the data stream 304 onto constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 306 may output a symbol stream 308, which may represents an input into an insertion unit 310.

The insertion unit 310 may be configured for inserting sequences known at the receiver within the input symbol stream 308, and generates a corresponding data stream 314 with inserted known sequences. Known sequences may comprise Golay codes and can be used by the receiver for tracking, channel estimation, detection and channel decoding. Known sequences may also comprise a guard interval inserted at the beginning of the input symbol stream 308. The output 314 of the insertion unit 310 may then be up-converted to a desired transmit frequency band by a radio frequency (RF) front end 316. An antenna 318 may then transmit the resulting signal 320.

Figure 4:
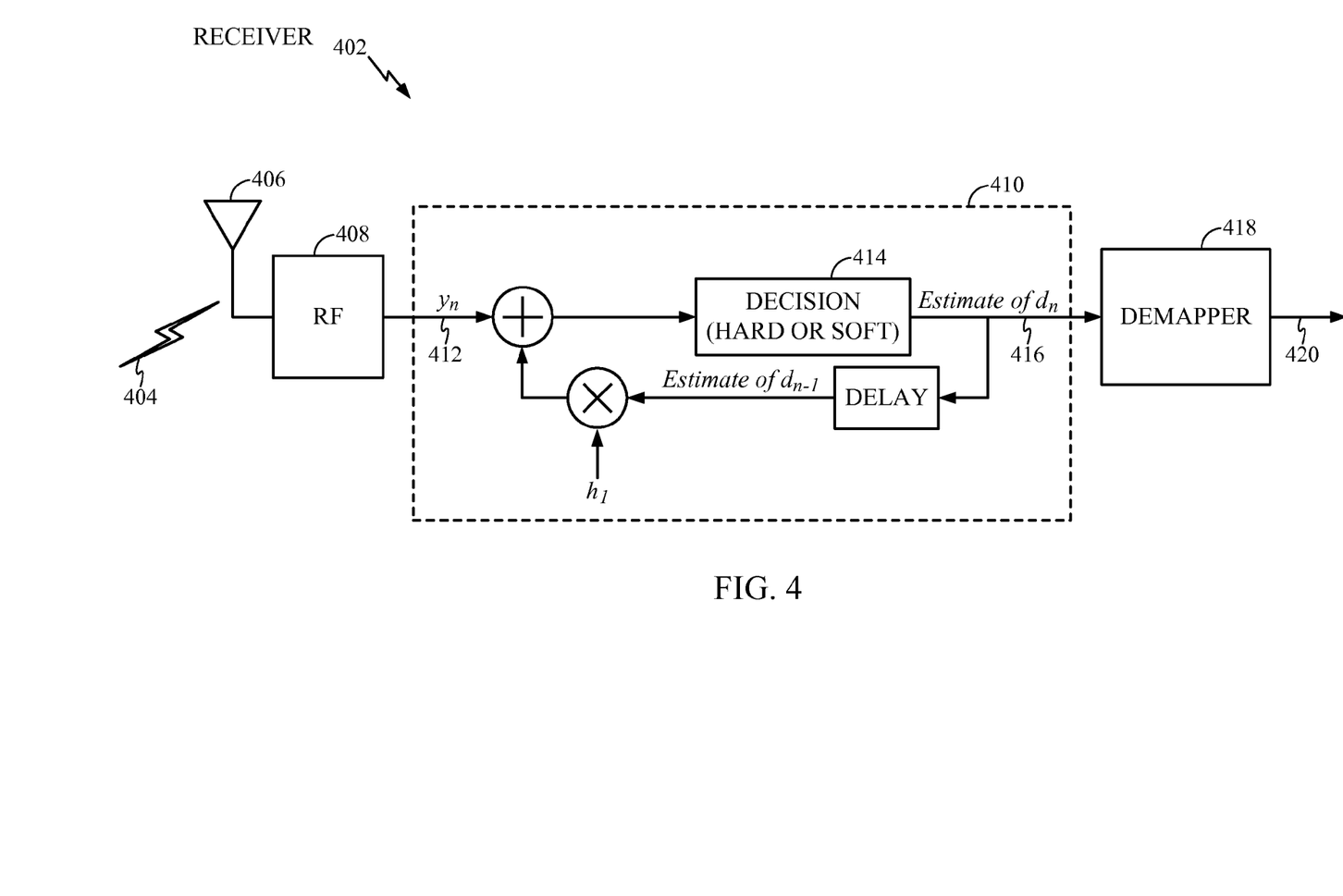
FIG. 4 illustrates an example receiver with sequential decision feedback equalization (DFE) that may be used within a wireless communication system in accordance with certain aspects of the present disclosure.

FIG. 4 illustrates an example of a receiver 402 that may be used within a wireless device 202 that utilizes a single-carrier or some other transmission technique. Portions of the receiver 402 may be implemented in the receiver 212 of a wireless device 202. The receiver 402 may be implemented in a user terminal 106 for receiving data 404 from a base station 104 on a downlink 108. The receiver 402 may also be implemented in a base station 104 for receiving data 404 from a user terminal 106 on an uplink 110.

When a signal 404 is received by an antenna 406, it may be down-converted and digitized to form a digital baseband signal 412 by an RF front end 408. A frame format of the received signal for single-carrier data communications typically comprises a known sequence followed by a data portion, which facilitates equalization based on a decision feedback.

For an exemplary case of a two-path multipath channel in time domain with channel taps $[h_0\ h_1]$, a received baseband signal $y_n$ may be expressed as:

$$y_n = d_n h_0 + d_{n-1} h_1 + w_n, \quad (1)$$

where $d_n$ is a current data symbol, $d_{n-1}$ is a previous data symbol, an $w_n$ is additive white Gaussian noise (AWGN). For $|h_0| > |h_1|$, the receiver may use a simple one-tap decision feedback equalizer (DFE), such as the one illustrated in FIG. 4.

The DFE portion 410 of the receiver 402 may be configured to normalize the first channel tap such that the received baseband signal 412 may be given as:

$$y_n = d_n + d_{n-1} h_1 + w_n. \quad (2)$$

The DFE portion of the receiver may be also adapted for multipath channels having more than two paths. In such cases, the received baseband signal may be expressed as:

$$y_n = d_n + d_{n-1}h_1 + \ldots + d_{n-M}h_M + w_n. \quad (3)$$

For the first data symbol $d_0$ of a data portion of the frame, the previous data symbol $d_{-1}$ may be from the known sequence. Thus, an estimate $\hat{d}_0$ of the first data symbol may be derived by subtracting interference due to the preceding symbol $d_{-1}h_1$ from the received signal $y_0$ and by providing for a soft or hard decision on the difference:

$$\hat{d}_0 = \text{decision}(y_0 - h_1 d_{-1}). \quad (4)$$

For example, for BPSK modulation, the decision operation in equation (4) is simply the sign operation.

Once $\hat{d}_0$ is determined, it can be used to estimate the next data symbol $d_1$ from $y_1$, as follows:

$$\hat{d}_1 = \text{decision}(y_1 - h_1 \hat{d}_0), \quad (5)$$

where $y_1 = d_1 + d_0 h_1 + w_1$.

In general, as illustrated in FIG. 4, once $\hat{d}_{n-1}$ is determined, it can be multiplied with the channel tap $h_1$ and then subtracted from the received symbol $y_n$. Estimate of a data symbol $d_n$ may be determined by a decision unit 414 (e.g., a soft or hard decision unit) as:

$$\hat{d}_n = \text{decision}(y_n - h_1 \hat{d}_{n-1}), n \geq 0 \quad (6)$$

A demapper 418 may input an equalized data stream 416 and may perform the inverse of the symbol mapping operation that was performed by the mapper 306 from FIG. 3 thereby outputting a data stream 420. Ideally, this data stream 420 corresponds to the data 304 that was provided as input to the transmitter 302, as illustrated in FIG. 3.

A clock (not shown) employed by the DFE portion of the receiver in FIG. 4 may be typically operated at an integer-multiple of the input signal's data rate $f_y$. For very high data rates (e.g., 1728 MHz, which has been adopted in the IEEE 802.15.3c standard), it may be impractical to operate such high clock frequencies. Moreover, the receiver can be typically a mobile device, and power dissipation may be prohibitively high if the mobile device is operated with very high clock frequency.

Parallel Equalization

Certain aspects of the present disclosure employ a special format of a transmission frame (data stream) and parallel equalization allowing a clock to operate at a fraction of the input signal data rate $f_y$.

Figure 5:
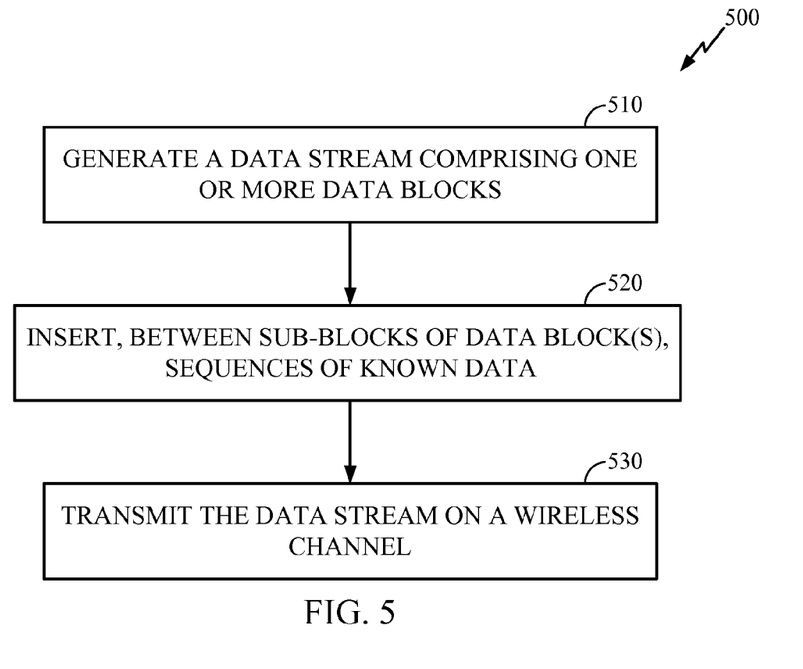
FIG. 5 illustrates example operations for transmitting data stream with inserted known sequences in accordance with certain aspects of the present disclosure.

FIG. 5 illustrates example operations 500 for transmitting a data stream with inserted known sequences supporting parallel equalization operations at a receiver, such as, for example, decision feedback equalization (DFE) operations.

At 510, the data stream may be generated that comprises one or more data blocks. Sequences of known data may be inserted between sub-blocks of each data block, at 520. Such data stream with inserted known sequences may be then transmitted over a wireless channel, at 530.

Figure 6A:
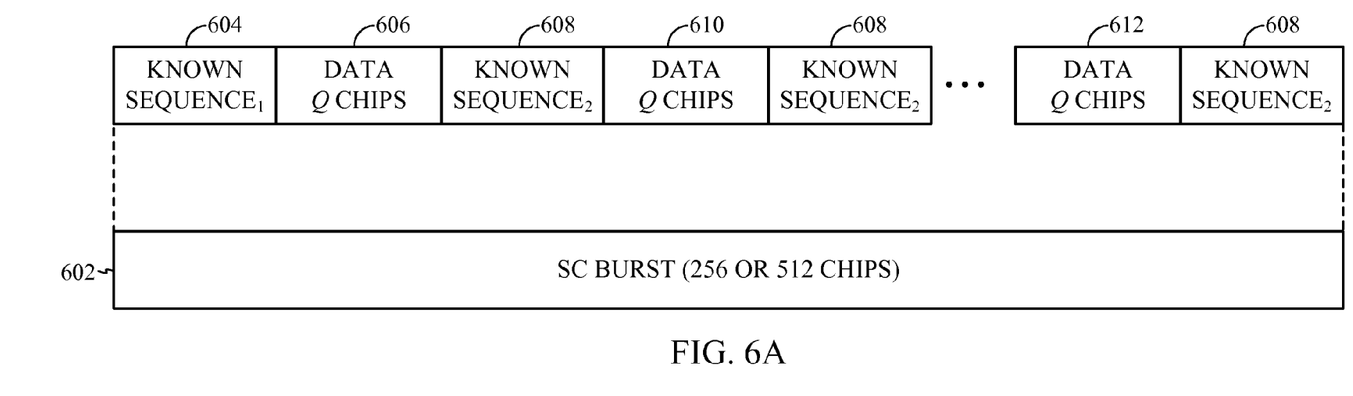
FIGS. 6A-6B illustrate examples of data-block structures for a single-carrier transmission in accordance with certain aspects of the present disclosure.
Figure 6B:
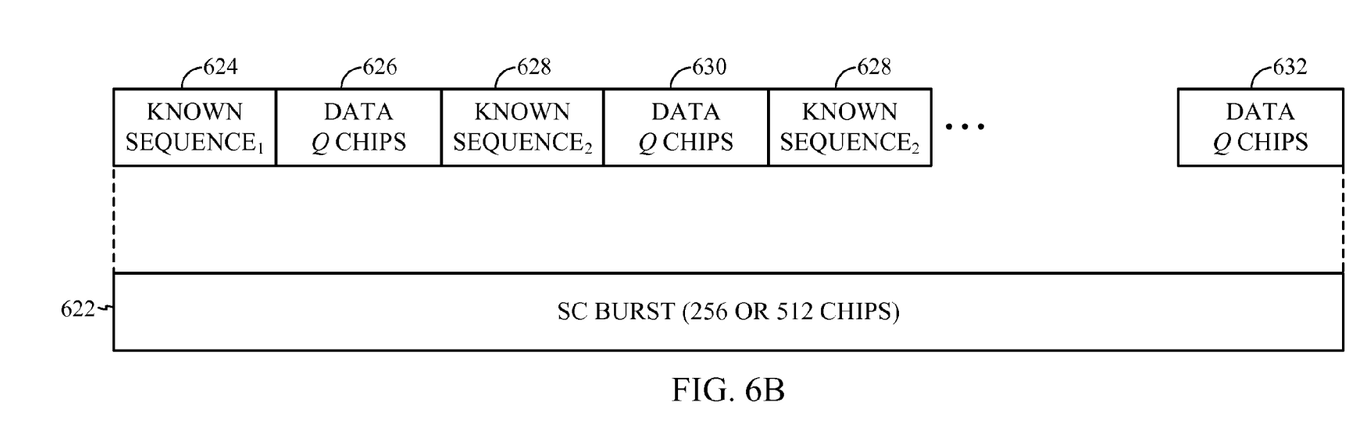

FIG. 6A and FIG. 6B are representations of a structure of one data block for a single-carrier transmission signal that support employing parallel equalization operations at the receiver. In FIG. 6A, a short known sequence 608 may follow the last data sub-block 612 of a data block 602. It can be assumed, without loss of generality, that sub-blocks 606, 610, and 612 may comprise Q chips (samples). FIG. 6B illustrates a data block structure in which the trailing known short sequence 628 of the last sub-block 632 of a data block 622 may be omitted. It can be also assumed, without loss of generality, that sub-blocks 626, 630 and 632 may also comprise Q chips (samples).

Single-carrier bursts (i.e., data blocks) 602 and 622 may comprise $M=2^m$ chips (where m>1) in order to facilitate a frequency domain equalization that employs fast Fourier transform (FFT) of received samples. As illustrated in FIGS. 6A-6B, the data blocks 602 and 622 may comprise, for example, 256 or 512 samples.

For certain aspects of the present disclosure, the frequency domain equalization may be applied at the receiver when the wireless channel has a substantial number of paths. In this case, the channel may be divided into flat-fading frequency sub-components (i.e., sub-carriers) that can be equalized independently with a lower computational complexity than the computational complexity of time domain equalization. On the other hand, time domain equalization (such as, for example, the previously described time domain DFE) may be more appropriate for environments with a smaller number of channel paths in order to reduce computational complexity and power dissipation of receiver processing. In this particular case, each known sequence 608 and 628 may comprise a number of samples related to a time domain channel length. The channel length may be available at the transmitter side. Therefore, the appropriate number of known samples may be included between each data sub-block, and these known samples may be used at the receiver for equalization of data samples.

A first known sequence 604 (i.e., a sequence that is known at the receiver) of the data block 602 in FIG. 6A and a first known sequence 624 of the data block 622 in FIG. 6B may be followed by a sub-block 606 and a sub-block 626, respectively. Lengths of the first known sequences 604 and 624 may be typically equal to or greater than the largest expected channel length, and may be, for example, equal to a mean-squared multipath delay, a total multipath delay, or to some other function of the channel multipath delay. The first known sequence of the data block may be utilized to update channel estimates, provide for frequency and time tracking, and to facilitate the frequency domain equalization.

The data portion of the blocks 602 and 622 may be partitioned into a plurality N of data sub-blocks. At least one known short sequence indicated as 608 in FIGS. 6A and 628 in FIG. 6B may be inserted between each data sub-block. The number N of data sub-blocks within the data block may provide for a parallelism factor of N, which may divide the required clock frequency by the factor of N. The short sequence 608 in FIG. 6A and the short sequence 628 in FIG. 6B (which may be as short as one chip) may be used to facilitate parallel processing at the receiver that employs a decision feedback equalization (DFE) or a maximum likelihood sequence estimation (MLSE). Alternatively, the receiver may employ other receiver processing techniques configured to process a plurality of parallel data sub-blocks at a lower rate than a rate of the receiving data streams.

Each short sequence 608 or 628 may comprise a single chip or a plurality of chips (samples), and the short sequences may be selected in accordance with the channel length. Thus, certain aspects of the present disclosure may be configured to support a wide range of channel lengths. Furthermore, time- and/or frequency-domain equalization techniques may be used to produce an effective impulse response shorter than the channel impulse response. This facilitates the use of short sequences when the channel length is long. For example, a channel-shortening filter may shorten a long channel length to a length of only five chips. In this case, each short sequence 608 or 628 may comprise four chips of known data. In some aspects of the present disclosure, it may be useful to adjust the length of the short sequences 608 and 628 in response to changing channel lengths.

Figure 7:
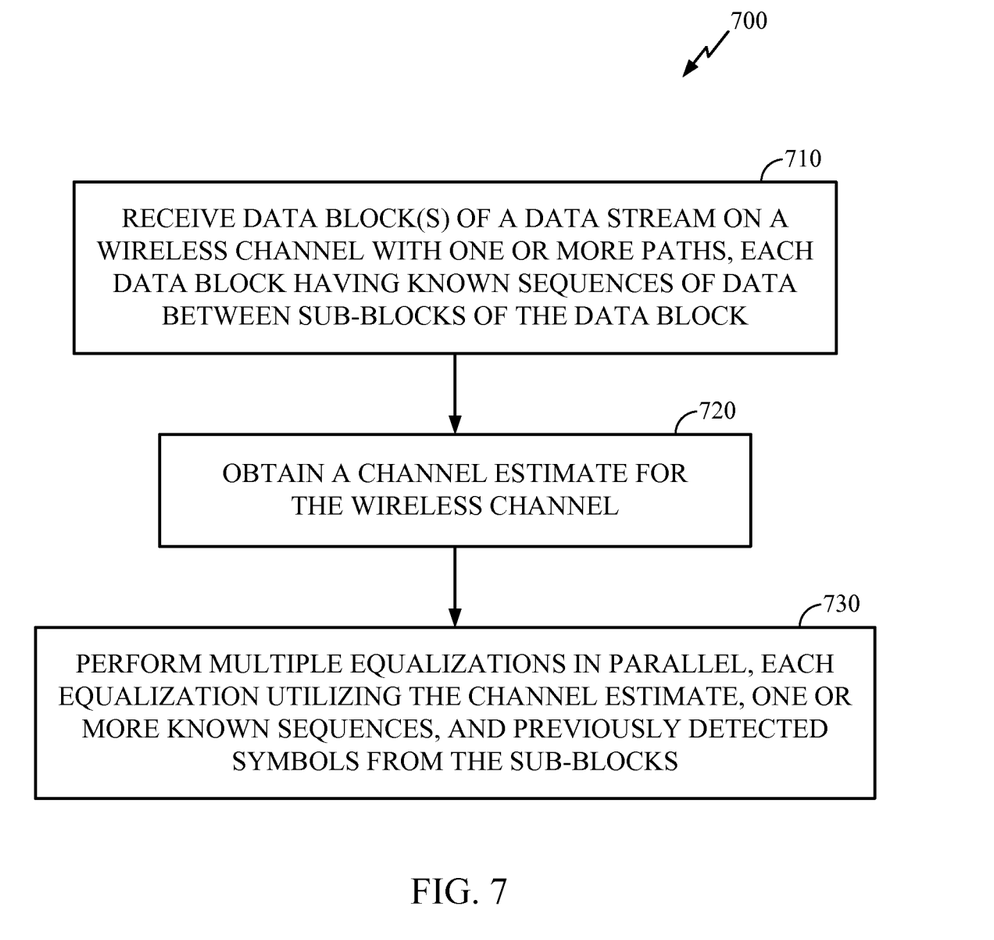
FIG. 7 illustrates example operations for performing parallel equalization at the receiver in accordance with certain aspects of the present disclosure.
Figure 8:
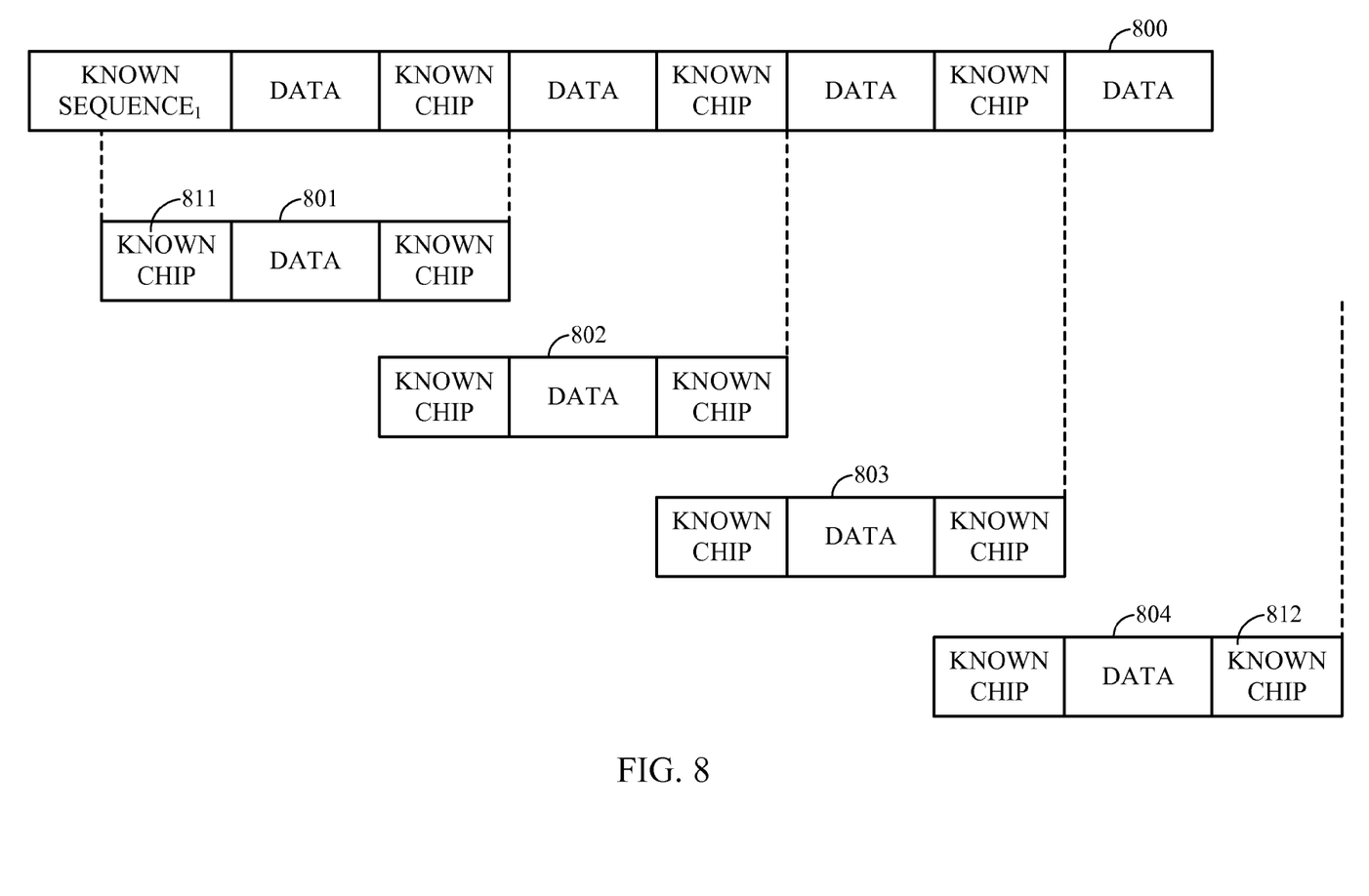
FIG. 8 illustrates an example of data-block structure that comprises sub-blocks and known sequences inserted between each sub-block in accordance with certain aspects of the present disclosure.

FIG. 7 illustrates example operations 700 for performing parallel equalization at the receiver. FIG. 8 illustrates a data block structure 800 for a single carrier signal wherein the data block may be partitioned into four sub-blocks and a known chip may be placed between each sub-block. While this particular aspect of the present disclosure employs four sub-blocks and a short sequence of one chip, alternative aspects may employ different numbers of sub-blocks and short sequences longer than one chip.

At 710, one or more data blocks may be received. Each data block may comprise known sequences of data between sub-blocks of that data block. As illustrated in FIG. 8, the data block 800 may be demultiplexed into four sub-blocks 801-804, each of which can be processed by an equalizer (such as, for example, decision feedback equalizer) at a quarter of the input signal's data rate $f_y$. Each sub-block 801-804 may comprise a data segment bounded by a known chip. The first sub-block 801 has a first chip 811 from the known sequence preceding the data segment. The fourth sub-block 804 has a trailing chip 812, which may be from the known sequence of the following block (not shown in FIG. 8).

At 720, known sequences may be utilized to compute channel estimates. After that, at 730, multiple equalizations may be performed in parallel. Each equalization may utilize the computed channel estimates, known sequences, and previously detected symbols from the sub-blocks, as given by equation (6).

Figure 9:
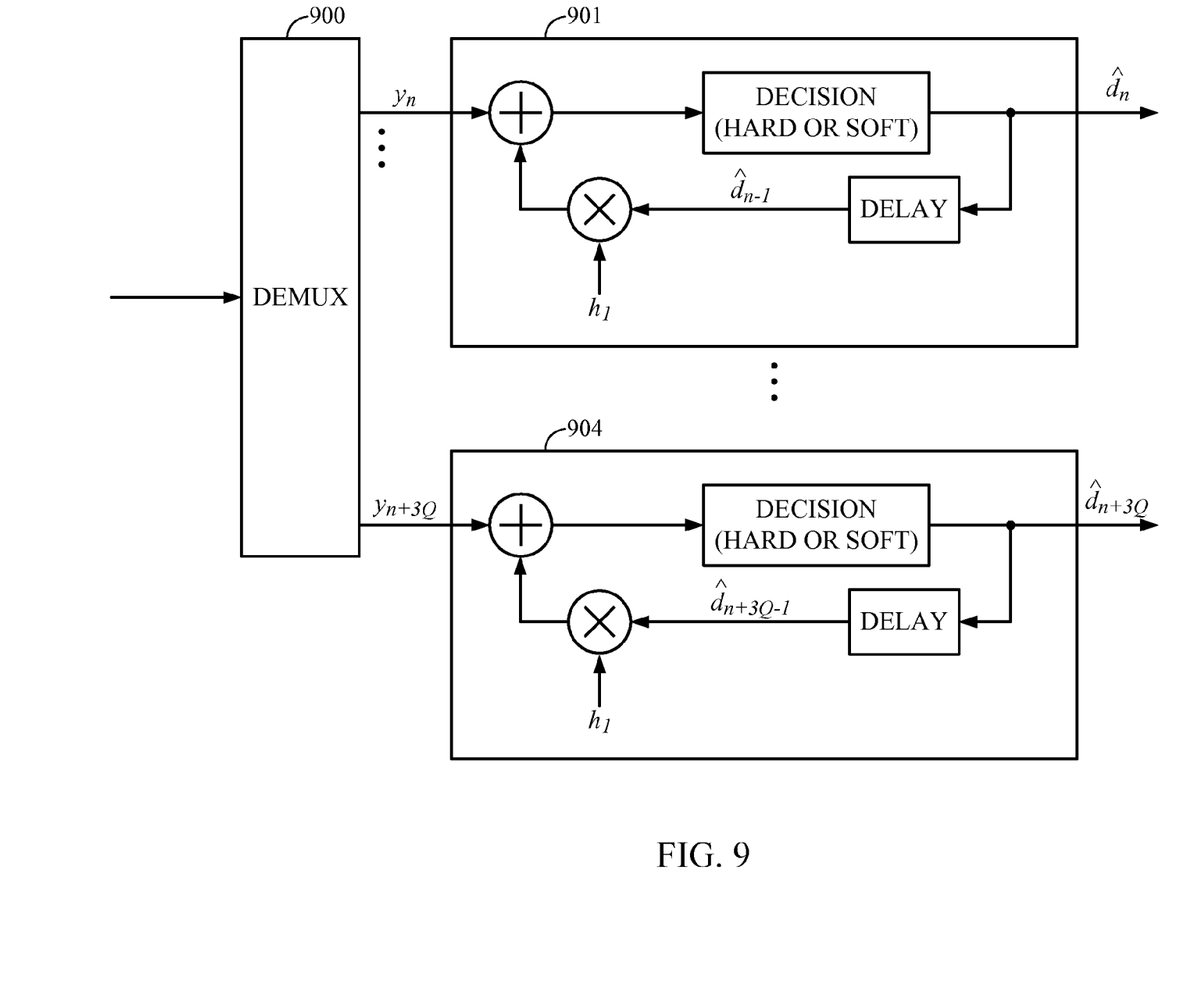
FIG. 9 illustrates an example receiver with parallel equalizers in accordance with certain aspects of the present disclosure.

FIG. 9 illustrates an example receiver in accordance with one aspect of the present disclosure. Four parallel decision feedback equalizers (DFEs) 901-904 may follow a demultiplexer 900 and may be configured for processing sub-blocks 801-804 at a quarter of the input signal's data rate $f_y$. The DFEs 901-904 may operate independently of each other because each equalizer starts processing from a known state (i.e., with a known chip).

It should be appreciated that the data block 800 may be demultiplexed in different ways. For example, each of the sub-blocks 801-804 illustrated in FIG. 8 includes both a leading known chip and a trailing known chip bounding each end of its data portion. For a DFE-based processing, only the leading known chip may be required. Therefore, certain aspects of the present disclosure may provide for demultiplexing the data block without including the trailing known chip. In some other aspects of the present disclosure, the DFEs 901-904 may be replaced by parallel maximum likelihood sequence estimators, in which case the trailing known chip may be utilized.

It should be appreciated that variations to the aspects illustrated and described herein may be provided without departing from the scope of the disclosure. While only a single data block (frame) is illustrated in the figures, receivers and receiving methods in accordance with alternative aspects of the disclosure may be configured to process a plurality K of data blocks in parallel, resulting in an increased parallelism factor of N·K.

For example, two of the data blocks (such as the data block 602 illustrated in FIG. 6B) may be demultiplexed simultaneously by the demultiplexer 900 illustrated in FIG. 9. Since there are twice as many data sub-blocks being demultiplexed, eight parallel DFEs (or other similar receiver components) may need to be provided. Eight parallel DFEs may be controlled with a clock rate of $f_y/8$.

Figure 5A:
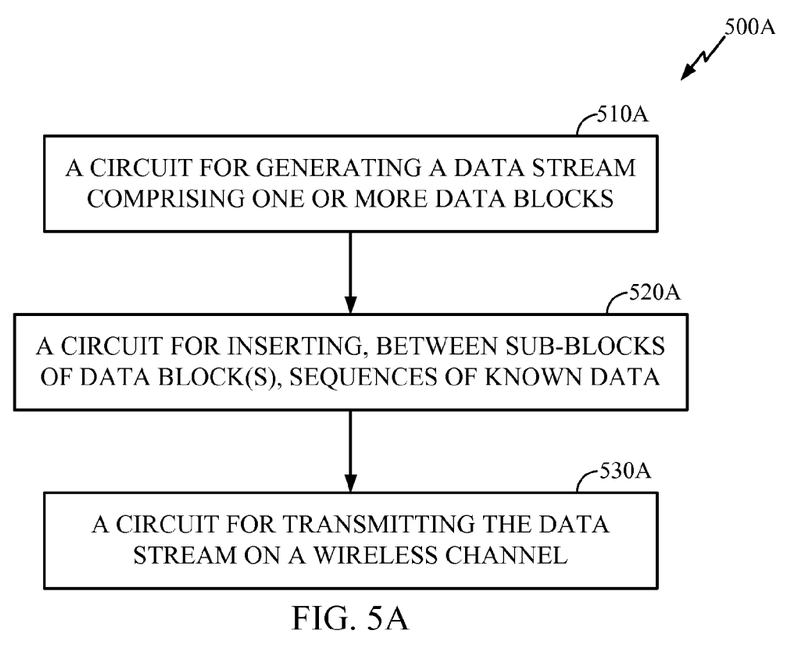
FIG. 5A illustrates example components capable of performing the operations illustrated in FIG. 5.
Figure 7A:
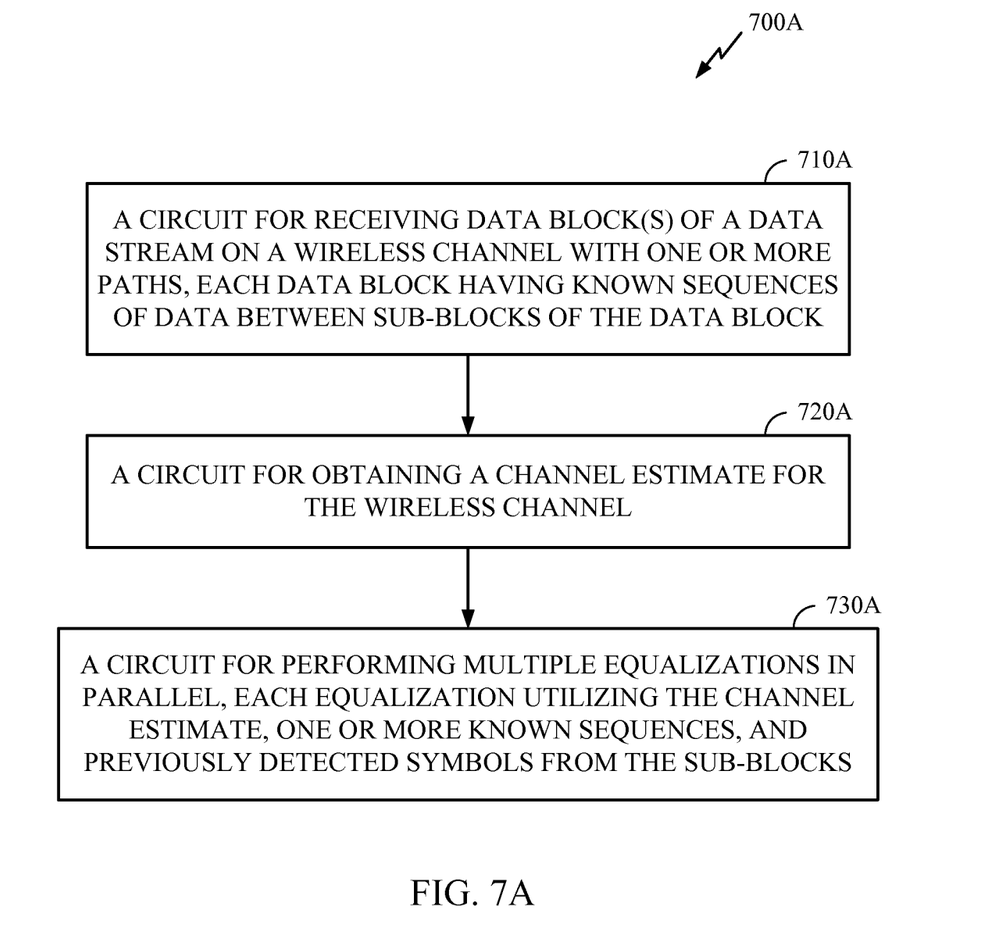
FIG. 7A illustrates example components capable of performing the operations illustrated in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 510-530 and 710-730 illustrated in FIGS. 5 and 7 correspond to circuit blocks 510A-530A and 710A-730A illustrated in FIGS. 5A and 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point, a mobile handset, a personal digital assistant (PDA) or other type of wireless devices that operate in UWB part of spectrum with processing logic and elements to perform the techniques provided herein.

The invention claimed is:

1. A method for wireless communications, comprising:
generating, at a first device, a data stream comprising at least one data block, wherein a length M of the data block is determined by an equation $M=2^m$ samples, where m is a positive integer;
inserting, at the first device, between sub-blocks of the at least one data block, sequences of known data; and
transmitting a signal comprising the data stream composed of the sub-blocks and the inserted sequences of known data from the first device to a second device via a wireless channel,
wherein a length of the sequences of known data depends on a multipath delay associated with the signal propagating from the first device to the second device via one or more paths of the wireless channel.

2. The method of claim 1, wherein the sequences of known data are selected to allow parallel equalization operations to be performed by a receiver at the second device when estimating the transmitted data stream.

3. The method of claim 1, wherein the at least one data block comprises a Golay sequence.

4. The method of claim 1, wherein a length of a first one of the sequences of known data is selected to accommodate a largest expected number of paths of the wireless channel, and the first sequence of known data is a Golay sequence.

5. A method for wireless communications, comprising:
receiving, at a first device, a signal comprising at least one data block of a data stream, each of the at least one data block having known sequences of data between sub-blocks of the data block, wherein the signal is received from a second device via a channel;
obtaining a channel estimate for at least one path of the channel; and
performing multiple equalizations in parallel, each equalization utilizing the channel estimate, at least one of the known sequences, and at least one of the sub-blocks, wherein a length of the sequences of known data depends on a multipath delay associated with the signal propagating from the second device to the first device via the at least one path of the channel and wherein a length of the data blocks is $M=2^m$, where m is a positive integer.

6. The method of claim 5, wherein a length of a first one of the sequences of known data is selected to accommodate a largest expected number of channel paths, and the first sequence of known data is a Golay sequence.

7. The method of claim 5, wherein the data is received at a first rate, and the equalizations are performed at a second rate lower than the first rate.

8. The method of claim 7, wherein the second rate is determined based on the first rate and a number of equalizations performed in parallel.

9. The method of claim 5, wherein the data blocks are preceded by a Golay sequence.

10. The method of claim 5, wherein equalization of a last received sub-block of the data block uses Golay sequence of a subsequently received data block.

11. The method of claim 5, wherein the equalizations are performed in frequency domain if a number of channel paths is greater than a defined threshold value.

12. The method of claim 5, wherein the equalizations are performed in time domain if a number of channel paths is smaller than a defined threshold value.

13. An apparatus for wireless communications, comprising:
a generator for generating a data stream comprising at least one data block, wherein a length M of the data block is determined by an equation $M=2^m$ samples, where m is a positive integer;
a device for inserting, between sub-blocks of the at least one data block, sequences of known data; and a transmitter for transmitting a signal comprising the data stream composed of the sub-blocks and the inserted sequences of known data from the apparatus to a device via a wireless channel, wherein a length of the sequences of known data depends on a multipath delay associated with the signal propagating from the apparatus to the device via one or more paths of the wireless channel.

14. The apparatus of claim 13, wherein the sequences of known data are selected to allow parallel equalization operations to be performed by a receiver at the device when estimating the transmitted data stream.

15. The apparatus of claim 13, wherein the at least one data block comprises a Golay sequence.

16. The apparatus of claim 13, wherein a length of a first one of the sequences of known data is selected to accommodate a largest expected number of paths of the wireless channel, and the first sequence of known data is a Golay sequence.

17. An apparatus for wireless communications, comprising: a receiver for receiving a signal comprising at least one data block of a data stream, each of the at least one data block having known sequences of data between sub-blocks of the data block, wherein the signal is received from a device via a channel; an estimator for obtaining a channel estimate for at least one path of the channel; and an equalizer for performing multiple equalizations in parallel, each equalization utilizing the channel estimate, at least one of the known sequences, and at least one of the sub-blocks, wherein a length of the sequences of known data depends on a multipath delay associated with the signal propagating from the device to the apparatus via the at least one path of the channel and wherein a length of the data blocks is M=2^m, where m is a positive integer.

18. The apparatus of claim 17, wherein a length of a first one of the sequences of known data is selected to accommodate a largest expected number of channel paths, and the first sequence of known data is a Golay sequence.

19. The apparatus of claim 17, wherein the data is received at a first rate, and the equalizations are performed at a second rate lower than the first rate.

20. The apparatus of claim 19, wherein the second rate is determined based on the first rate and a number of equalizations performed in parallel.

21. The apparatus of claim 17, wherein the data blocks are preceded by a Golay sequence.

22. The apparatus of claim 17, wherein equalization of a last received sub-block of the data block uses Golay sequence of a subsequently received data block.

23. The apparatus of claim 17, wherein the equalizations are performed in frequency domain if a number of channel paths is greater than a defined threshold value.

24. The apparatus of claim 17, wherein the equalizations are performed in time domain if a number of channel paths is smaller than a defined threshold value.

25. An apparatus for wireless communications, comprising:

means for generating a data stream comprising at least one data block, wherein a length M of the data block is determined by an equation $M=2^m$ samples, where m is a positive integer;

means for inserting, between sub-blocks of the at least one data block, sequences of known data; and means for transmitting a signal comprising the data stream composed of the sub-blocks and the inserted sequences of known data from the apparatus to a device via a wireless channel, wherein a length of the sequences of known data depends on a multipath delay associated with the signal propagating from the apparatus to the device via one or more paths of the wireless channel.

26. The apparatus of claim 25, wherein the sequences of known data are selected to allow parallel equalization operations to be performed by a receiver at the device when estimating the transmitted data stream.

27. The apparatus of claim 25, wherein the at least one data block comprises a Golay sequence.

28. The apparatus of claim 25, wherein a length of a first one of the sequences of known data is selected to accommodate a largest expected number of paths of the wireless channel, and the first sequence of known data is a Golay sequence.

29. An apparatus for wireless communications, comprising: means for receiving a signal comprising at least one data block of a data stream, each of the at least one data block having known sequences of data between sub-blocks of the data block, wherein the signal is received from a device via a channel; means for obtaining a channel estimate for at least one path of the channel; and means for performing multiple equalizations in parallel, each equalization utilizing the channel estimate, at least one of the known sequences, and at least one of the sub-blocks, wherein a length of the sequences of known data depends on a multipath delay associated with the signal propagating from the device to the apparatus via the at least one path of the channel and wherein a length of the data blocks is M=2^m, where m is a positive integer.

30. The apparatus of claim 29, wherein a length of a first one of the sequences of known data is selected to accommodate a largest expected number of channel paths, and the first sequence of known data is a Golay sequence.

31. The apparatus of claim 29, wherein the data is received at a first rate, and the equalizations are performed at a second rate lower than the first rate.

32. The apparatus of claim 31, wherein the second rate is determined based on the first rate and a number of equalizations performed in parallel.

33. The apparatus of claim 29, wherein the data blocks are preceded by a Golay sequence.

34. The apparatus of claim 29, wherein equalization of a last received sub-block of the data block uses Golay sequence of a subsequently received data block.

35. The apparatus of claim 29, wherein the equalizations are performed in frequency domain if a number of channel paths is greater than a defined threshold value.

36. The apparatus of claim 29, wherein the equalizations are performed in time domain if a number of channel paths is smaller than a defined threshold value.

37. A computer-program product for wireless communications, comprising a computer readable storage device encoded with instructions executable to:

generate, at a first device, a data stream comprising at least one data block, wherein a length M of the data block is determined by an equation $M=2^m$ samples, where m is a positive integer;

insert, at the first device, between sub-blocks of the at least one data block, sequences of known data; and transmit a signal comprising the data stream composed of the sub-blocks and the inserted sequences of known data from the first device to a second device via a wireless channel, wherein a length of the sequences of known data depends on a multipath delay associated with the signal propagating from the first device to the second device via one or more paths of the wireless channel of the wireless channel.

38. A computer-program product for wireless communications, comprising a computer readable storage device encoded with instructions executable to:

receive, at a first device, a signal comprising at least one data block of a data stream, each of the at least one data block having known sequences of data between sub-blocks of the data block, wherein the signal is received from a second device via a channel;

obtain a channel estimate for at least one path of the channel; and perform multiple equalizations in parallel, each equalization utilizing the channel estimate, at least one of the known sequences, and at least one of the sub-blocks, wherein a length of the sequences of known data depends on a multipath delay associated with the signal propagating from the second device to the first device via the at least one path of the channel and wherein a length of the data blocks is $M=2^m$, where m is a positive integer.

39. An access point, comprising:

at least one antenna;

a generator for generating a data stream comprising at least one data block, wherein a length M of the data block is determined by an equation $M=2^m$ samples, where m is a positive integer;

a device for inserting, between sub-blocks of the at least one data block, sequences of known data; and a transmitter for transmitting via the at least one antenna a signal comprising the data stream composed of the sub-blocks and the inserted sequences of known data from the access point to a device via a wireless channel, wherein a length of the sequences of known data depends on a multipath delay associated with the signal propagating from the access point to the device via one or more paths of the wireless channel.

40. A mobile handset, comprising: at least one antenna; a receiver for receiving via the at least one antenna a signal comprising at least one data block of a data stream, each of the at least one data block having known sequences of data between sub-blocks of the data block, wherein the signal is received from a device via a channel; an estimator for obtaining a channel estimate for at least one path of the channel; and an equalizer for performing multiple equalizations in parallel, each equalization utilizing the channel estimate, at least one of the known sequences, and at least one of the sub-blocks, wherein a length of the sequences of known data depends on a multipath delay associated with the signal propagating from the device to the mobile handset via the at least one path of the channel and wherein a length of the data blocks is $M=2^m$, where m is a positive integer.

41. The method of claim 1, wherein the multipath delay comprises a mean-squared multipath delay associated with the signal propagating from the first device to the second device via the one or more paths of the wireless channel.

42. The method of claim 1, wherein the multipath delay comprises a total multipath delay associated with the signal propagating from the first device to the second device via the one or more paths of the wireless channel.

43. The method of claim 5, wherein the multipath delay comprises a mean-squared multipath delay associated with the signal propagating from the second device to the first device via the at least one path of the channel.

44. The method of claim 5, wherein the multipath delay comprises a total multipath delay associated with the signal propagating from the second device to the first device via the at least one path of the channel.

\* \* \* \* \*